United States Patent [19]
Weyeneth

[11] Patent Number: 5,366,186
[45] Date of Patent: Nov. 22, 1994

[54] MODULE RETENTION SPRING CLIP

[75] Inventor: Gregory A. Weyeneth, Dearborn, Mich.

[73] Assignee: Ford Motor Compnay, Dearborn, Mich.

[21] Appl. No.: 108,220

[22] Filed: Aug. 19, 1993

[51] Int. Cl.⁵ .............................................. G12B 9/00
[52] U.S. Cl. .................... 248/27.3; 248/231.9
[58] Field of Search ...................... 248/27.3, 27.1, 300, 248/551, 231.8, 231.9, 224.4; 200/295, 296; 220/3.6; 296/70

[56] References Cited
U.S. PATENT DOCUMENTS

| | | | |
|---|---|---|---|
| 4,550,944 | 11/1985 | Simon et al. | 296/70 |
| 4,572,465 | 2/1986 | Rasca | 248/27.1 |
| 4,577,818 | 3/1986 | Clarisse | 248/27.3 |
| 4,816,966 | 3/1989 | Frankowski | 248/27.3 X |
| 4,993,668 | 2/1991 | Inamura | 248/27.3 |
| 5,238,427 | 8/1993 | Fry et al. | 248/231.9 X |

Primary Examiner—Ramon O. Ramirez
Attorney, Agent, or Firm—Roger L. May; Mark L. Mollon

[57] ABSTRACT

A retention clip for securing and aligning an instrument module, such as a radio, in an instrument panel of a vehicle. The clip includes a base and primary and secondary fingers extending in cantilever fashion from the base for retaining and releasing the module from the instrument panel. The secondary fingers are shorter and extend from the base less than the primary fingers such that the ends of the fingers will sequentially engage the instrument panel to retain and align the module in the instrument panel. The secondary fingers have a removal ramp, engageable by a removal tool inserted through the module, and a portion overlaying the primary fingers such that when the removal tool is inserted, the secondary fingers will retract and also will retract the primary fingers for a slip-out fit.

13 Claims, 2 Drawing Sheets

MODULE RETENTION SPRING CLIP

TECHNICAL FIELD

This invention relates to mounting brackets and more particularly to mounting brackets for electronic equipment in vehicles.

BACKGROUND ART

Many instruments on the instrument panel of a vehicle today are designed to be installed as a module with a simple slip-in fit wherein the module can be installed securely and aligned properly by simply pushing it into the instrument panel. Some type of bracket or clips will automatically lock the particular module into place without having to reach behind the panel to secure the module, and without requiring any tools to install it. Many of these instrument modules are also removable from the front, again without the need to remove brackets or screws from behind the panel to remove the unit from its support, by using a simple removal tool that merely slides through some holes in the front of the module and disengages the bracket or clip from the instrument panel.

One such design uses a pair of simple spring clips, one each mounted on the sides of the instrument module, just behind a front bezel of the module. An example of such a design is disclosed in U.S. Pat. No. 4,550,944 to Simon et al., incorporated herein by reference. Each clip has a pair of retention fingers with corresponding barbs that secure and align the module in the instrument panel. The fingers are connected to a base portion at their rear end. The base portion fastens to the module. The fingers either angle away from the side of the module protruding more as they extend toward the bezel, with the barbs on the front end of the fingers that catch on the back side of the instrument panel; or the fingers run parallel with the side of the module and the barbs themselves protrude outward at the front end of the fingers to catch on the instrument panel.

Also, each of these spring clips includes a pair of extraction ramps, each ramp connected to a corresponding finger. The extraction ramps align with associated holes through the front of the module bezel, which accept an extracting tool. A portion of the extracting tool slides up on the ramps, which causes the ramps to pull the fingers, and consequently the barbs, toward the side of the module, away from the back of the instrument panel. This allows the module to be slid out of the instrument panel.

The retention fingers of these spring clips are under a constant stress due to deflection caused by contact with the back of the instrument panel while the module is installed. The corresponding spring force, due to stress, assures that the module stays aligned and secure. What these particular prior art spring clips lack is a secondary back-up securing and aligning mechanism. Preferably one that is under less stress, and hence, less fatigue, to insure there is always a back-up or secondary system at the ready. This way there would be no reduction in the maximum force the clip could withstand during a rear vehicle impact or a forced removal.

The difficulty with creating this back-up system is that the module should still be easily and quickly installed and removed from the front of the instrument panel by simply sliding it in and out. Also, it is desirable to accomplish this with a similar simple tool as is currently used with these types of clips. Further, it is desirable to fabricate the bracket inexpensively, from a single piece of material, and maintain the lightweight characteristics of current spring clips.

Additionally, some instrument modules, such as radios, are becoming larger due to added features and, as a result, need more support. However, one will not want to add to the cost and weight of retaining the radios, nor reduce the simplicity of installation and removal. The trend toward heavier radios makes a robust spring clip design desirable to assure sufficient support to meet any rear collision or forced removal radio retention needs.

DISCLOSURE OF INVENTION

The present invention contemplates a retention spring clip for securing an instrument module in an installed position within an opening in an instrument panel of a vehicle. The retention clip includes a base affixed to the instrument module. A primary support member extends a first distance from the base, for biasing securely against the opening in the instrument panel in the installed position. This primary support member is oriented to allow a slip-in fit installation and for retaining the instrument module in the installed position. A secondary support member also extends from the base, a second distance, different from the first distance, for biasing securely against the opening within the instrument panel in the installed position. This secondary support member also allows a slip-in fit installation and retains the module in the installed position. The secondary support member is biased against the instrument panel in the installed position after the primary support member in response to the different extensions of the support members from the base.

Accordingly, it is an object of the present invention to provide a spring clip for use with an instrument module in a vehicle that has both primary and secondary retention fingers, with the secondary finger biased against the instrument panel in the installed position after the primary finger in response to different extensions of the fingers from the base, and yet allows the module to be simple to install and remove from the instrument panel.

It is an additional object of the present invention to provide a spring clip, having both primary and secondary retention fingers extending different lengths from the base, formed from one integral stamped part.

It is further an object of the present invention to provide a spring clip for use with an instrument module in a vehicle wherein one of the primary or secondary retention fingers includes a removal ramp extending therefrom, with the ramp being actuatable to release both the primary and secondary retention fingers from the opening in the instrument panel thereby allowing a slip-out fit of the instrument module.

An advantage of the present invention is that it can use similar, if not the same, removal tools as are currently available for these particular types of spring clips currently used when removing instrument modules from an instrument panel.

The foregoing and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
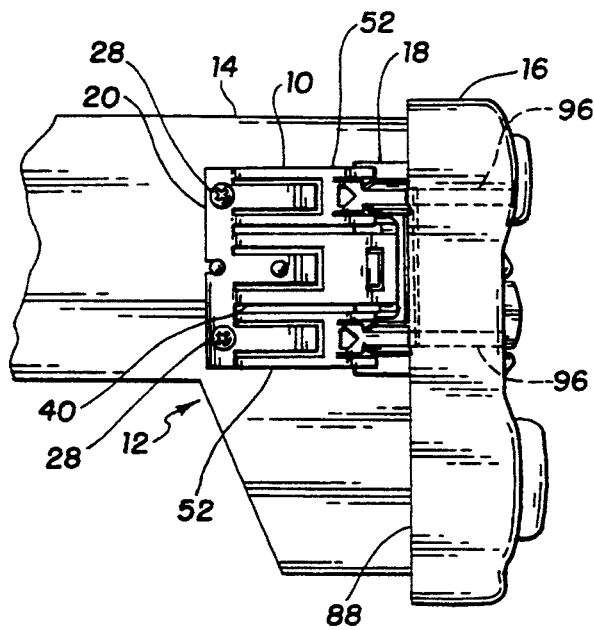
FIG. 1 is a partial side elevation view of a radio and spring clip in accordance with the present invention.

FIG. 1 illustrates one of a pair of spring clips 10 mounted on either side of an instrument module. The spring clips 10 on either side of the instrument module are identical for simplicity of fabrication. Here, a partial side view of a radio 12 is shown with the clip 10 mounted to the radio housing 14 just behind the radio bezel 16. When referring to front and back herein, front refers to the side of the instrument that protrudes from the instrument panel and is visible to the operator of the vehicle, whereas back refers to the part of the instrument module that is recessed into an instrument panel.

Figure 2:
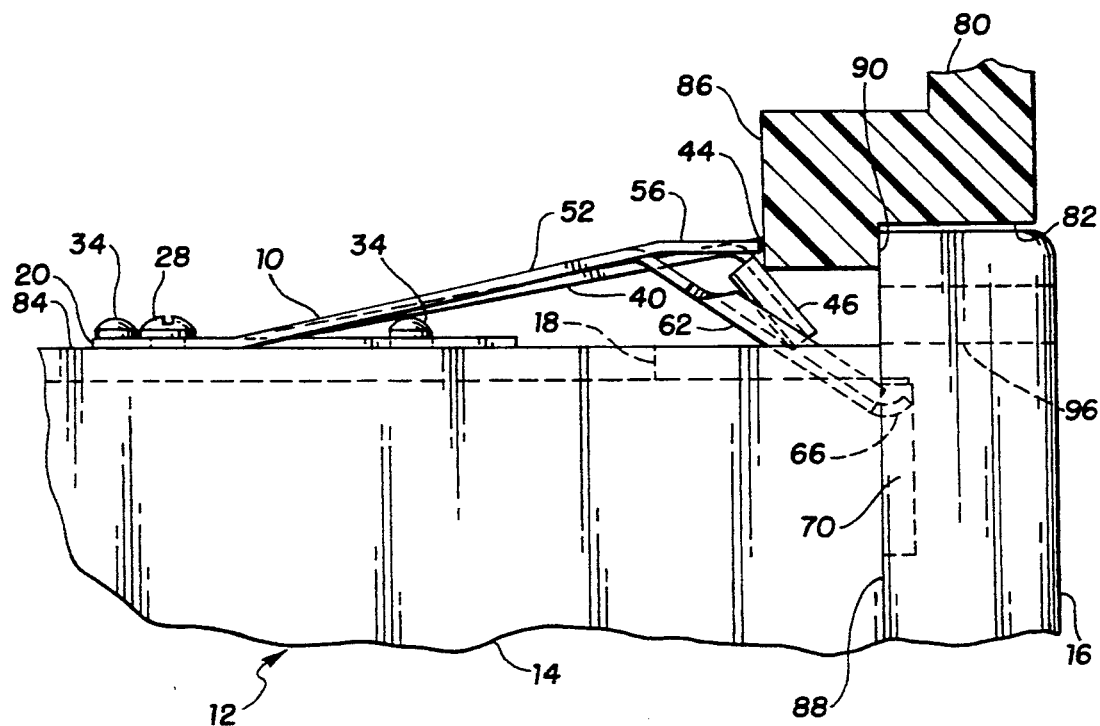
FIG. 2 is a partial plan view, on an enlarged scale, of a radio and spring clip in accordance with the present invention.
Figure 3:
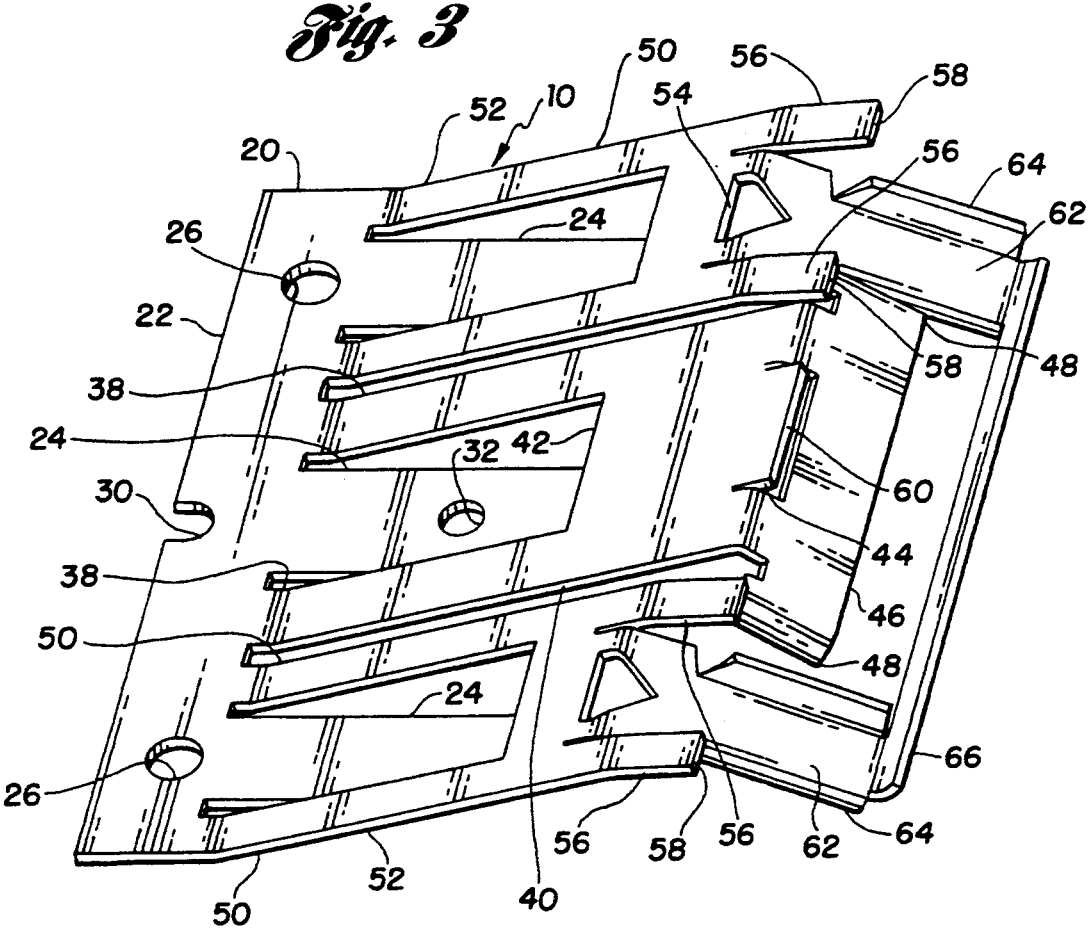
FIG. 3 is a perspective view, on an enlarged scale, of the retention spring clip in accordance with the present invention.

Referring to FIGS. 1–3, a spring clip 10 is shown that is fabricated from a single flat piece of high carbon spring steel, cut and stamped to form all the features of the clip 10. The single piece design keeps fabrication costs and weight down over a more complicated multiple piece design. Preferably the clip 10 is made of AISI 1080 steel, although other similar materials can also be used.

The clip 10 has a base portion 20, including a mounting member 22 and three support members 24, which lie flat against the side 84 of the radio housing 14. The mounting member 22 is provided with two mounting holes 26 for receiving a pair of fasteners 28. It is also provided with a locating notch 30. The center of the three support members 24 is provided with a locating hole 32. The locating hole 32 and the locating notch 30 mate with a pair of corresponding locating lugs 34 protruding from the radio housing 14, assuring proper alignment and orientation of the spring clip 10 on the side 84 of the radio housing 14.

Extending from the base portion 20, on either side of the center support member 24, are two arms 38 of a primary retention finger 40. The arms 38 join to form a front portion 42 of the primary retention finger 40. The angle between the base portion 20 and the primary retention finger 40 in the unstressed formed clip 10 is approximately 15 degrees. Since the base portion 20 is parallel with the side 84 of the radio housing 14, the primary retention finger is also at an angle of 15 degrees from the side 84 of the radio housing 14.

At the center of and projecting from the front portion 42 of the primary finger 40 is a primary retention barb 44. The front portion 42 extends around either side of the primary barb 44 to create a primary tab 46. The primary tab 46 bends inward from the front portion 42 at an angle of approximately 58 degrees in the unstressed formed clip 10. The bend in the front portion 42 is just back of front tip 60 of the primary retention barb 44. The primary tab 46 includes a pair of primary extraction catches 48, at either end, that curve inward toward the side 84 of the radio housing 14.

Also extending from the base portion 20 are two pair of secondary arms 50 of two secondary retention fingers 52, one pair associated with each secondary finger 52. The secondary arms 50 also angle about 15 degrees from the base 20 in the unstressed formed clip 10. At the front end of each pair of the secondary arms 50 is a triangular-shaped extraction cutout 54. On either side of each cutout 54 is a pair of secondary retention barbs 56 extending forward of the cutout 54. The front tips 58 of the secondary barbs 56 do not extend as far forward from the mounting member 22 as the front tip 60 of the primary barb 44.

An extraction ramp 62 extends forward around each extraction cutout 54. The ramps 62 are angled from the secondary arms 50, at an angle of approximately 44 degrees, toward the side 84 of the radio housing 84. Along each side of each extraction ramp 62 is a stiffening guide 64, curved outward from the radio housing 14. The stiffening guides 64 provide for support and guidance of a removal tool inserted through the radio bezel 16. The ramps 62 extend into the radio housing 14 through a cutout 18 in the side 84 of the housing 14.

Extending between the front ends of the extraction ramps 62 is a retention lip 66, curved outward from the housing 14. When the spring clip 10 is mounted on the radio housing 14, the retention lip 66 fits into a slotted opening 70 in the back 88 of the bezel 16, within the housing 14. The retention lip 66 and extraction ramps 62 limit the travel of the secondary retention fingers 52 to an angle of about 13 degrees rather than the unstressed angle of 15 degrees. This limit puts a slight pre-stress in the secondary fingers 52, and also prevents the fingers 52 from being bent outward from the side 84 of the housing 14 beyond their original position.

A vehicle instrument panel 80 includes an opening 82 just larger than the dimensions of the radio housing 14 within which the radio 12 slides. To install the radio 12, one slides the radio 12 from the front of the instrument panel 80 into the opening 82. The opening 82 is sized such that the sides 84 of the radio housing 14 can slip through with minimal clearance. One spring clip 10 protrudes from each side 84 of the housing 14 beyond the edge of the opening 82. When the instrument panel 80 contacts the spring clips 10, as the radio 12 is pushed back into the instrument panel 80, the instrument panel 80 causes the primary and secondary fingers 40, 52 to retract inward toward the side 84 of the housing 14 until the front ends 58, 60 of the secondary and primary fingers 40, 52 pass behind the back side 86 of the instrument panel 80.

The primary finger 40 then springs partially free to wedge against the rear 86 of the instrument panel 80. The rear 88 of the radio bezel 16 is, at this point, seated against a lip 90 on the instrument panel 80, thereby completing the installation of the radio 12 into the instrument panel 80.

The primary finger 40 expands outward until the primary tab 46 contacts the instrument panel 80. This position is not back to the primary finger 40 unstressed position of 15 degrees, but only to about 10 degrees, so it is under a retention load prestress. The secondary fingers 52 also spring partially free and expand outward until the retention lip 66 or extraction ramps 62 contact one end of the slotted opening 70 in the bezel 16. This position is also not back to the 15 degree un-stressed position, but only to about 13 degrees as discussed above.

While the front tips 58 of the secondary barbs 56 are now located behind the rear 86 of the instrument panel 80, they do not extend as far forward as the front tip 60 of the primary barb 44 and are not in contact with the rear 86 of the instrument panel 86. Thus, the secondary fingers 52 are not under the constant stress, as is the primary finger 40. In this way, the secondary fingers 52 act as a back-up to the primary finger 40.

The primary and secondary retention fingers 40, 52 can act independently in the installed position and have different stress pre-loads on their respective arms 38, 50. The pre-loads serve two functions, first they assure that the barbs 44, 56 stay behind the instrument panel 80 to retain and secure the radio 12 in place; and second they assure proper centering and alignment of the radio 12 in the opening 82 of the instrument panel 80 by maintaining a spring force on either side of the radio 12.

The secondary fingers 52 act as a back-up system for the primary finger 40 to assure that the radio 12 stays secure in the instrument panel 80 and centered in the opening 82 should the primary retention finger 40 not retain and center the unit sufficiently. The retention load stress decreases maximum extraction force that the steel in the primary finger 40 can withstand during rear vehicle impact or forced removal.

Figure 4:
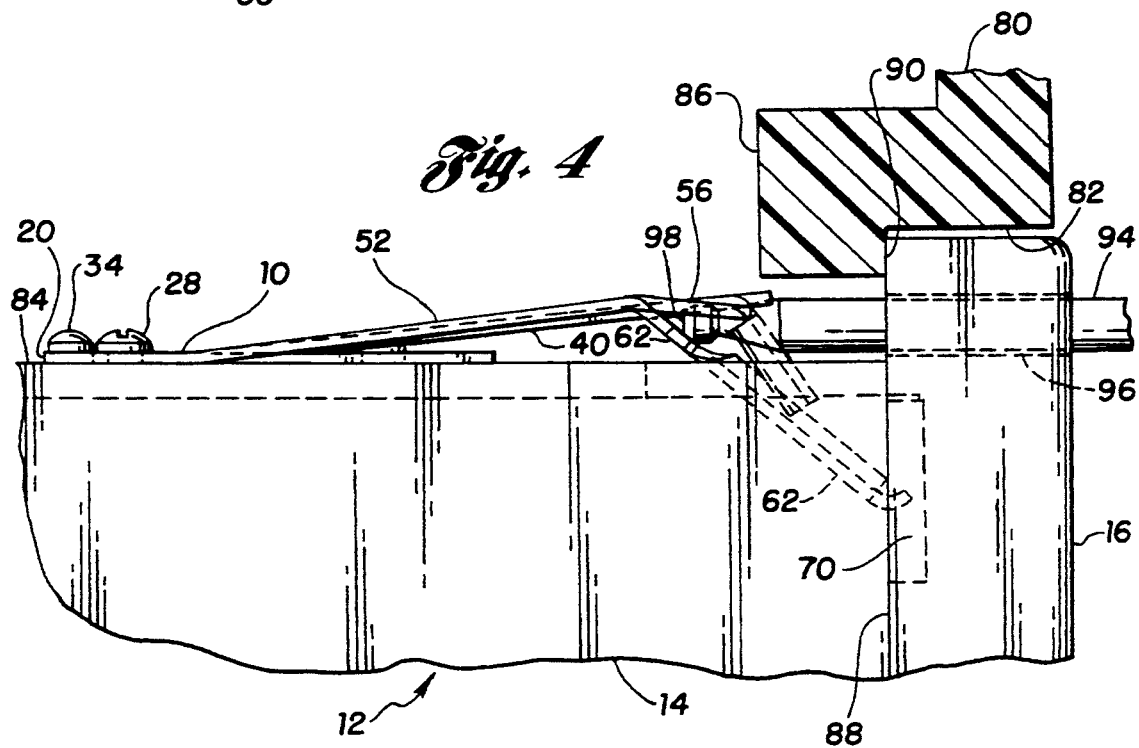
FIG. 4 is a plan view similar to FIG. 2, with the removal tool shown installed, in accordance with the present invention.

The radio 12 can be removed from the front of the instrument panel 80 with a slip-out fit. FIG. 4 shows a portion of an extraction tool 94 adapted for use with the present invention. In this figure, the spring clip 10 is shown in its retracted position. The extraction tool 94 is inserted from the front of the radio bezel 16 through radio extraction passages 96. One passage 96 is aligned with each extraction ramp 62.

When the extraction tool 94 is inserted from the front of the radio 12, the ball 98 on the end of the tool 94 contacts the extraction ramp 62 about midway along the ramp 62. As the tool 94 is inserted farther into the radio 12, the ball 98 begins to ride back on the ramp 62 and depresses the ramp 62. This causes the secondary finger 52 to retract inward toward the side 84 of the radio housing 14. One of the secondary barbs 56, located on each side of the primary finger 40, then catches the primary extraction catch 48 and, in turn, causes the secondary fingers 52 to also retract the primary finger 40. The retention lip 66 prevents the secondary fingers 52 from twisting when the primary extraction catches 48 are contacted.

The retraction continues until just prior to the ball 98 reaching the extraction cutout 54, as shown in FIG. 4. At this point, the primary and secondary fingers 40, 52 will be retracted sufficiently so that their respective barbs 44, 56 no longer catch on the back 86 of the instrument panel 80, thus clearing the edges of the opening 82 in the instrument panel 80. Pushing the extraction tool 94 back farther will then cause the ball 98 to engage the extraction cutout 54 and lock into place. An end of the extraction tool 94, or tools, must be inserted in each extraction passage 96 to ensure that all of the retention fingers 40, 52 retract on both of the spring clips 10 mounted on the sides 84 of the radio housing 14 before the radio 12 can be pulled out of the front of the instrument panel 80 by the extraction tool 94.

While the best mode for carrying out the invention has been described in detail, those familiar with the art to which this invention relates will recognize various alternative designs and embodiments for practicing the invention as defined by the following claims.

I claim:

1. A retention clip for securing an instrument module in an installed position within an opening in an instrument panel of a vehicle comprising:
    a base affixed to the instrument module;
    a primary support member, extending a first distance from the base, including biasing for securely contacting against the panel peripheral to the opening in the instrument panel in the installed position and which allows a slip-in fit installation, and for retaining the instrument module in the installed position; and
    a secondary support member, extending a second distance different than the first distance from the base, including biasing for securely positioning behind but not in contact with the panel peripheral to the opening in the instrument panel in the installed position and which allows a slip-in fit installation, and for retaining the module in the installed position after the primary support member retracts in response to the different extensions of the support members from the base.

2. The retention clip of claim 1 including a removal ramp extending from one of the primary or the secondary support members and actuatable to release both the primary and secondary support members from the opening in the instrument panel, thereby allowing a slip-out fit.

3. The retention clip of claim 2 wherein the secondary support member comprises two support fingers extending from the base on either side of and spaced from the primary support member and wherein the removal ramp extends from each of the secondary support fingers.

4. The retention clip of claim 1 wherein the base, the primary support member and the secondary support member are integrally formed.

5. The retention clip of claim 1 wherein the primary support member and the secondary support member are biased under a pre-stress when in the installed position.

6. In combination with an instrument module, a spring clip for retaining such instrument module in an opening of an instrument panel and for releasing the module from such retention by a tool, the clip comprising:
    a unitary spring member having a base affixed to the instrument module; and
    the unitary spring member having a plurality of spring fingers having ends extending in cantilever fashion away from the base and the module into selective and sequential engagement with the instrument panel for retaining and releasing the module in the opening;
    one of the spring fingers being longer than another of the spring fingers so that the ends of such fingers may sequentially engage the instrument panel to retain the instrument module in the instrument panel,
    wherein at least one of the spring fingers overlays a portion of the others of the spring fingers and is actuatable for selectively moving at least one of the ends of each of the spring fingers out of engagement with the instrument panel by such overlayment;
    the at least one spring finger having a ramp engageable by a tool insertable through the instrument panel for actuating the at least one spring finger, whereby the at least one end of each of the spring fingers is moved out of engagement with the instrument panel to release the instrument module from the instrument panel.

7. The combination of claim 6 wherein the spring clip is comprised of two spring clips, affixed to the instrument module in spaced relation to one another.

8. The combination of claim 7 wherein each of the spring fingers is biased under a pre-stress when the instrument module is retained in the instrument panel.

9. A retention clip for securing an instrument module in an installed position within an opening in an instrument panel of a vehicle comprising:
a base affixed to the instrument module;
a primary support member, extending from the base, including biasing for securely contacting against the panel peripheral to the opening in the instrument panel in the installed position and which allows a slip-in fit installation, and for retaining the instrument module in the installed position; and
a pair of secondary support members, extending from the base, including biasing for securely positioning behind but not in contact with the panel peripheral to the opening in the instrument panel in the installed position and for retaining the module in the installed position after the primary support member retracts, and which allows a slip-in fit installation.

10. The retention clip of claim 9 including a removal ramp extending from one of the primary or the secondary support members and actuatable to release both the primary and secondary support members from the opening in the instrument panel, thereby allowing a slip-out fit.

11. The retention clip of claim 9 wherein the secondary support members extend from the base on either side of and are spaced from the primary support member and wherein the removal ramp extends from each of the secondary support members.

12. The retention clip of claim 9 wherein the base, the primary support member and the secondary support members are integrally formed.

13. The retention clip of claim 9 wherein the primary support member and the secondary support members are biased under a pre-stress when in the installed position.

* * * * *